(12) United States Patent
Shi et al.

(10) Patent No.: US 11,095,090 B2
(45) Date of Patent: Aug. 17, 2021

(54) LASER MODULE AND LASER PROJECTION DEVICE

(71) Applicant: Qingdao Hisense Laser Display Co., Ltd., Shandong (CN)

(72) Inventors: Longfei Shi, Shandong (CN); Xintuan Tian, Shandong (CN)

(73) Assignee: Qingdao Hisense Laser Display Co., Ltd., Shandong (CN)

( * ) Notice: Subject to any disclaimer, the term of this patent is extended or adjusted under 35 U.S.C. 154(b) by 0 days.

(21) Appl. No.: 16/026,963

(22) Filed: Jul. 3, 2018

(65) Prior Publication Data
US 2019/0288480 A1 Sep. 19, 2019

(30) Foreign Application Priority Data
Mar. 16, 2018 (CN) .......................... 201810219487.0

(51) Int. Cl.
*H01S 3/23* (2006.01)
*H01S 3/04* (2006.01)

(52) U.S. Cl.
CPC .............. *H01S 3/23* (2013.01); *H01S 3/0405* (2013.01)

(58) Field of Classification Search
CPC ...... H01S 3/23; H01S 3/0405; H01S 5/02268; H01J 2237/2005; H01L 2924/163; H01L 2924/173; H01L 2924/18301; H05K 5/061; H01B 7/42; H01B 17/54
USPC .......................................................... 372/34
See application file for complete search history.

(56) References Cited

U.S. PATENT DOCUMENTS

| 5,285,462 A | * | 2/1994 | Kasahara | ............ H01S 5/02212 257/659 |
| 7,502,080 B2 | * | 3/2009 | Cho | .................. G02F 1/133603 349/61 |
| 9,249,966 B1 | * | 2/2016 | Hooi | ......................... F21K 9/20 |
| 2002/0036546 A1 | * | 3/2002 | Hatanaka | ............. H03H 9/0552 331/68 |

(Continued)

FOREIGN PATENT DOCUMENTS

| CH | 2023731253 | * | 7/2013 | ................ F21S 8/10 |
| CH | 205385193 | * | 7/2016 | ............. G03B 21/20 |

(Continued)

OTHER PUBLICATIONS

Chinese Search Report for corresponding Application No. PCT/CN2018/094366.

(Continued)

*Primary Examiner* — Tuan N Nguyen

(57) ABSTRACT

A laser module includes an encapsulating support, at least one laser, a sealing gasket, and a pressing plate. Each laser includes a supporting plate and a laser body that is fixed to the supporting plate. The supporting plate is fixed on the encapsulating support, and a surface of an end of the laser body away from the supporting plate is a light exit end face. The sealing gasket is located on a surface of the supporting plate close to the light exit end face, and the sealing gasket has a first opening at a position corresponding to the laser body. A pressing plate is located on a surface of the sealing gasket away from the supporting plate; the pressing plate is fixedly connected to the encapsulating support, and the pressing plate has a second opening at a position corresponding to the first opening.

14 Claims, 14 Drawing Sheets

(56) References Cited

U.S. PATENT DOCUMENTS

| | | | | |
|---|---|---|---|---|
| 2008/0055563 | A1* | 3/2008 | Momose | G03B 21/16 |
| | | | | 353/61 |
| 2008/0204680 | A1* | 8/2008 | Tieben | H01L 21/67017 |
| | | | | 355/30 |
| 2012/0287954 | A1* | 11/2012 | Saruwatari | H04N 9/3111 |
| | | | | 372/34 |
| 2013/0070215 | A1* | 3/2013 | Higo | H01S 5/02256 |
| | | | | 353/85 |
| 2014/0029637 | A1* | 1/2014 | Schmidt | H01S 5/02212 |
| | | | | 372/44.01 |
| 2014/0198509 | A1 | 7/2014 | Takiguchi et al. | |
| 2015/0301437 | A1 | 10/2015 | Tsuji | |
| 2016/0077414 | A1 | 3/2016 | Nishiyama et al. | |
| 2017/0251863 | A1* | 9/2017 | Murphy | B65D 85/8043 |

FOREIGN PATENT DOCUMENTS

| | | | | |
|---|---|---|---|---|
| CH | 205811265 | * | 12/2016 | H01S 3/02 |
| CN | 203731253 U | | 7/2014 | |
| CN | 205385193 U | | 7/2016 | |
| CN | 205811265 U | | 12/2016 | |

OTHER PUBLICATIONS

Office Action received from the State Intellectual Property Office of People's Republic of China for Application No. 201810219487.0 dated Mar. 19, 2020 (Chinese language only) (13 pages).

* cited by examiner

LASER MODULE AND LASER PROJECTION DEVICE

CROSS-REFERENCE TO RELATED APPLICATION

This application claims priority to Chinese Patent Application No. 201810219487.0, filed on Mar. 16, 2018, titled "A LASER MODULE, LASER SOURCE AND LASER PROJECTION DEVICE", which is incorporated herein by reference in its entirety.

TECHNICAL FIELD

The present disclosure relates to the field of projection technology, and in particular, to a laser module and a laser projection device.

BACKGROUND

High-quality sealing is required at the connection between components (especially between the laser module and the main housing) in the laser projection device. If the sealing at the connection of the components is not good, water, dust and other impurities in the external environment can easily enter the laser projection device via a gap at the connection, and thus change the transmission path of the internal laser beam of the laser projection device and reduce the intensity of laser beam.

BRIEF SUMMARY

Some embodiments of the present disclosure provide a laser module, which comprises an encapsulating support, at least one laser, a sealing gasket, and a pressing plate. Each laser comprises a supporting plate and a laser body fixed to the supporting plate. The supporting plate is fixed on the encapsulating support, and a surface of an end of the laser body away from the supporting plate is a light exit end face. The sealing gasket is located on a surface of the supporting plate close to the light exit end face, and the sealing gasket has a first opening at a position corresponding to the laser body. The pressing plate is located on a surface of the sealing gasket away from the supporting plate. The pressing plate is fixedly connected to the encapsulating support, and the pressing plate has a second opening at a position corresponding to the first opening.

Some embodiments of the present disclosure provide a laser projection device, which comprises a laser module and a main housing. The laser module is a laser module according to the embodiments described as above. The main housing is located on a light exit side of the laser module, and the encapsulating support of the laser module is connected with the main housing. The main housing has a third opening, the third opening is opposite to the second opening of the laser module, and the pressing plate and an edge of the main housing at the third opening are connected and sealed by a sealing structure.

Some embodiments of the present disclosure provide a laser projection device, which comprises at least one laser configured to emit laser beam; and a pressing plate, which is located at a light exit side of the at least one laser and is fixed to the at least one laser, and the pressing plate has a second opening that allows the laser beam to pass through. The main housing is located on a light exit side of the pressing plate and has a third opening opposite to the second opening. The pressing plate and an edge of the main housing at the third opening are connected and sealed by a sealing structure. The sealing structure comprises: an optically transparent plate located between the pressing plate and the main housing; a first sealing ring, which is disposed between the pressing plate and the optically transparent plate, and surrounds a circumference of the second opening; and a second sealing ring, which is disposed between the main housing and the optically transparent plate, and surrounds a circumference of the third opening.

BRIEF DESCRIPTION OF THE DRAWINGS

In order to describe technical solutions in embodiments of the present disclosure more clearly, the accompanying drawings to be used in the description of the embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1:
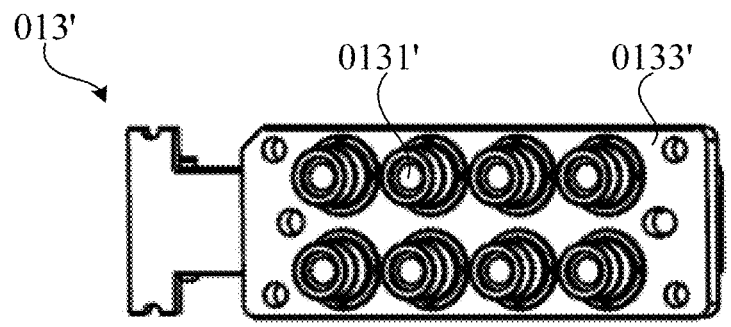
FIG. 1 is a front view of another laser according to some embodiments.

The technical solutions in the embodiments of the present disclosure will be described clearly and completely below with reference to the accompanying drawings in the embodiments of the present disclosure. Obviously, the described embodiments are merely some but not all of the embodiments of the present disclosure. All other embodiments obtained on the basis of the embodiments of the present disclosure by a person of ordinary skill in the art without paying any creative effort shall be included in the protection scope of the present disclosure.

It should be understood that in the description of the present disclosure, orientations or positional relationships indicated by terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore they should not be construed as limitations to the present disclosure. In the description of the present disclosure, "plurality" means two or more unless otherwise specified.

In the description of the present disclosure, it will be noted that the terms "mounted", "connected", and "connection" should be understood in a broad sense unless specifically defined or limited. For example, a connection may be a permanent connection, a detachable connection, or an integrated connection. For a person of ordinary skill in the art, the specific meanings of the above terms in the present disclosure should be understood according to specific circumstances.

Figure 2:
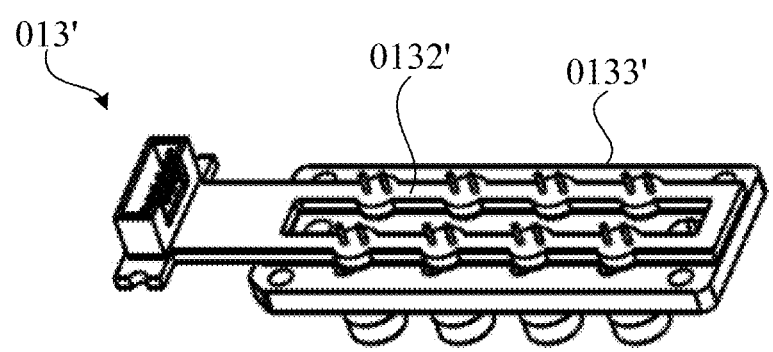
FIG. 2 is a rear view of the laser shown in FIG. 1.
Figure 3:
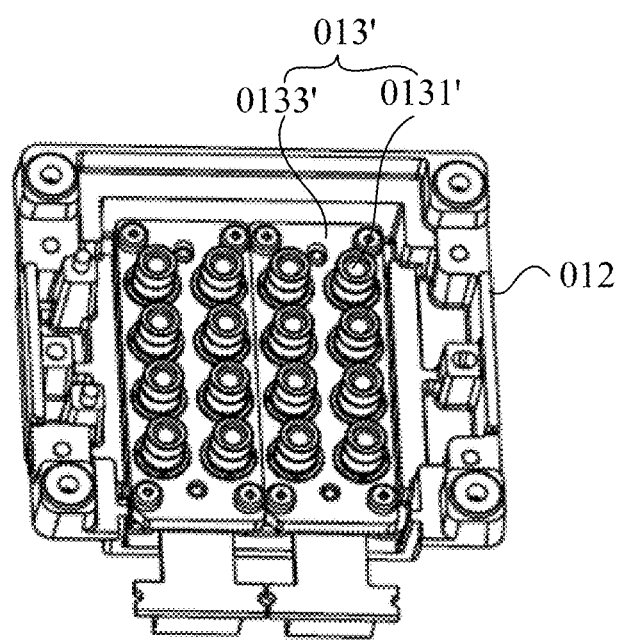
FIG. 3 is a schematic structural view of the laser shown in FIG. 1 mounted on an encapsulating support.

In some embodiments, the laser has an open structure as shown in FIGS. 1 and 2. Referring to FIGS. 1 and 2, the laser 013' includes a laser body 0131' configured to emit laser beam, a circuit board 0132', and a supporting member 0133'. The supporting member 0133' has a plate shape. Both the laser body 0131' and the circuit board 0132' are exposed on the supporting member 0133'. The supporting member 0133' has a fixing hole. One end of the laser body 0131' away from the light exit side passes through the fixing hole, and is fixed to the circuit board 0132' on a side of the supporting member 0133' away from the laser body 0131'. FIG. 3 shows the structure shown in FIG. 1 mounted on the encapsulating support 012.

Figure 4:
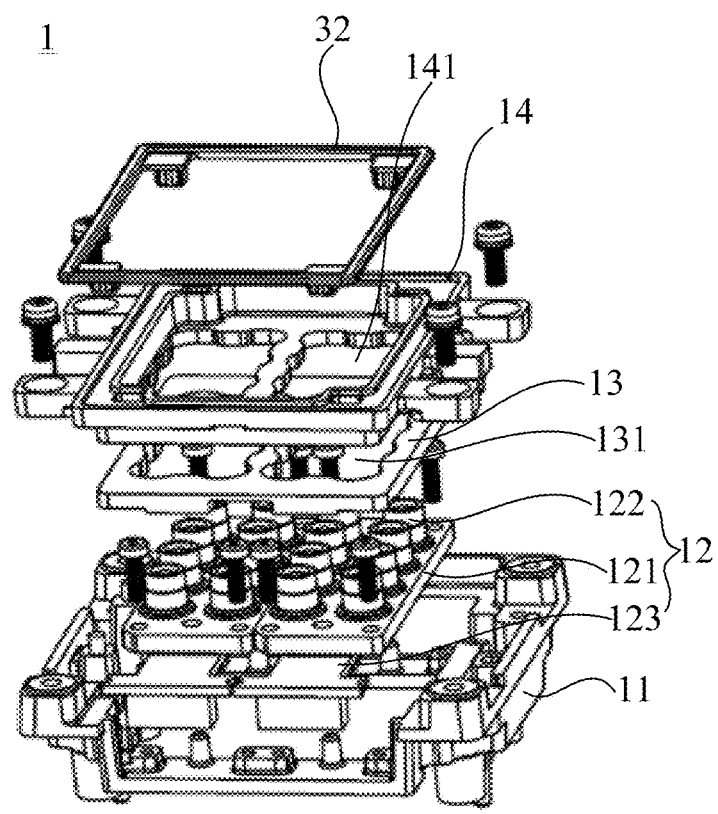
FIG. 4 is a schematic structural view of a laser module and a first sealing ring according to some embodiments of the present disclosure.

FIG. 4 is a laser module 1 according to some embodiments of the present disclosure. Referring to FIG. 4, the laser module 1 includes an encapsulating support 11, a laser 12, a sealing gasket 13 and a pressing plate 14. The laser 12 includes a supporting plate 121 and a laser body 122 fixed on the supporting plate 121. The supporting plate 121 is fixed on the encapsulating support 11. A surface of an end of the laser body 122 away from the supporting plate 121 is a light exit end face, that is, the surface of the upper end of the laser body 122 in FIG. 4 is a light exit end face. The sealing gasket 13 is located on a surface of the supporting plate 121 on which the laser body 122 is provided, and the sealing gasket 13 has a first opening 131 at a position corresponding to the laser body 122. The pressing plate 14 is located on a surface of the sealing gasket 13 away from the supporting plate 121, and the pressing plate 14 is fixedly connected to the encapsulating support 11. The pressing plate 14 has a second opening 141 at a position corresponding to the first opening 131.

In the laser module 1, as shown in FIG. 4, since the sealing gasket 13 is located on the supporting plate 121, the sealing gasket 13 compensates for a height difference between the surface of the supporting plate 121 adjacent to the sealing gasket 13 and the light exit end face of the laser body 122. Therefore, exposed height of the laser body 122 is reduced, and flatness of a surface of a light exit end of the laser 12 is improved to a certain degree. That is, a height difference between the light exit end face of the laser body 122 and a side surface of the sealing gasket 13 adjacent to the pressing plate 14 meets the preset requirement. Thus, when the laser module 1 is mounted in a laser projection device, it is convenient to seal the optical path between the laser 12 and the main housing through a sealing structure.

In some embodiments, the encapsulating support 11 has a box-like structure. In some other embodiments, the encapsulating support 11 has a block structure, which is not specifically limited herein.

In some embodiments, the sealing gasket 13 is made of a silicone material. In some other embodiments, the sealing gasket 13 is made of a fluororubber material. Since fluororubber is resistant to high temperatures and is stable in shape at a high temperature and does not generate gas, it is possible to avoid influence on the internal optical path of the laser module 1.

A thickness of the sealing gasket 13 and a thickness of the pressing plate 14 are not particularly limited. In some embodiments, a sum of the thickness of the sealing gasket 13 and the thickness of the pressing plate 14 is greater than or equal to a height of the laser body 122 protruding from the supporting plate 121, so that the height difference between the surface of the supporting plate 121 adjacent to the sealing gasket 13 and the light exit end face of the laser body 122 is completely compensated.

In some embodiments, the sealing gasket 13 with elasticity has a thickness reduction of 0.3 mm to 0.4 mm under the pressure of the pressing plate 14. In this way, the sealing gasket 13 may be in sealing engagement with the pressing plate 14 and the supporting plate 121, thereby sealing the internal optical path of the laser module 1. The thickness reduction is, for example, 0.3 mm, 0.35 mm, or 0.4 mm.

Figure 18:
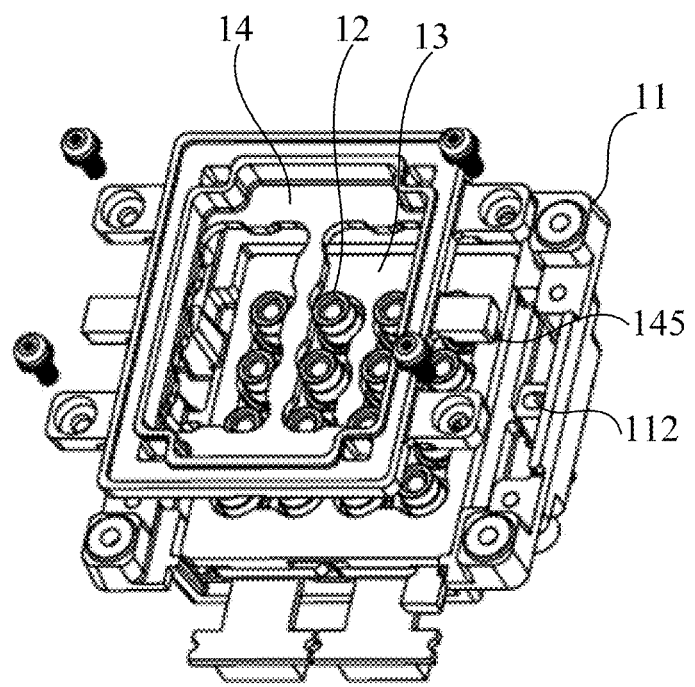
FIG. 18 is a schematic structural view of a pressing plate mounted on a sealing gasket, a laser and an encapsulating support in a laser module according to some embodiments of the present disclosure.
Figure 19:
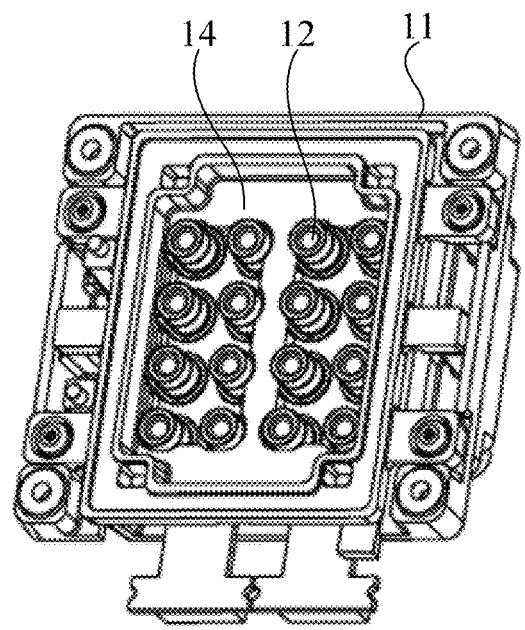
FIG. 19 is an assembly view of a pressing plate, a sealing gasket, a laser and an encapsulating support in a laser module according to some embodiments of the present disclosure.

In order to prevent impurities in the external environment from entering the optical path of the laser 12 via the gap between the sealing gasket 13 and the supporting plate 121, in some embodiments, as shown in FIGS. 18 and 19, an orthographic projection of the pressing plate 14 on the encapsulating support 11 covers an orthographic projection of the sealing gasket 13 on the encapsulating support 11, so that the sealing gasket 13 is completely pressed against the supporting plate 121 to avoid a gap between the sealing gasket 13 and the supporting plate 121. Therefore, water, dust and other impurities in the external environment are prevented from entering the optical path of the laser 12 via the gap.

Figure 5:
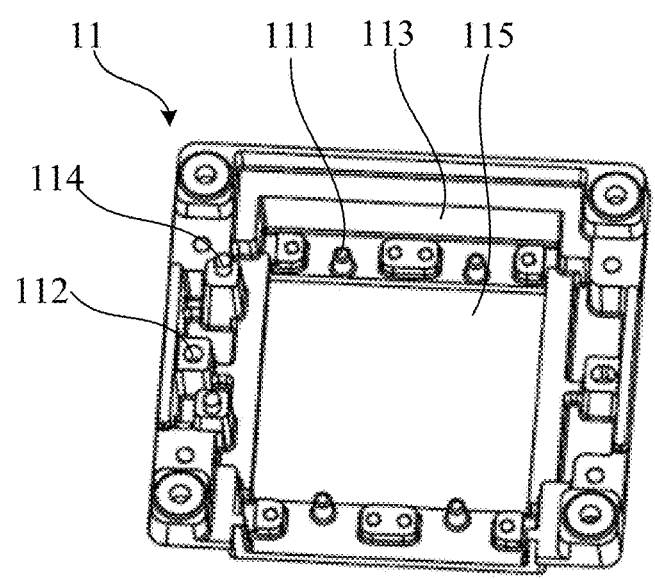
FIG. 5 is a schematic structural view of a first surface of an encapsulating support in a laser module according to some embodiments of the present disclosure.
Figure 7:
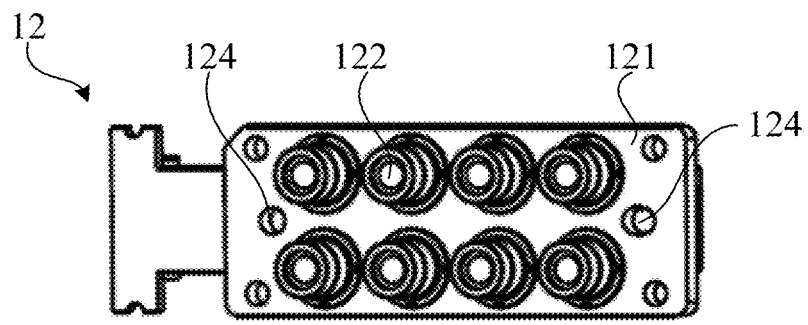
FIG. 7 is a front view of a laser in a laser module according to some embodiments of the present disclosure.
Figure 12:
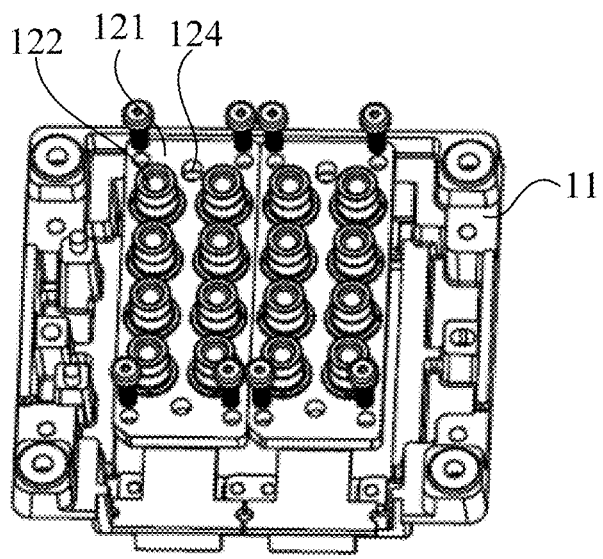
FIG. 12 is a schematic structural view of a laser mounted on an encapsulating support in a laser module according to some embodiments of the present disclosure.
Figure 13:
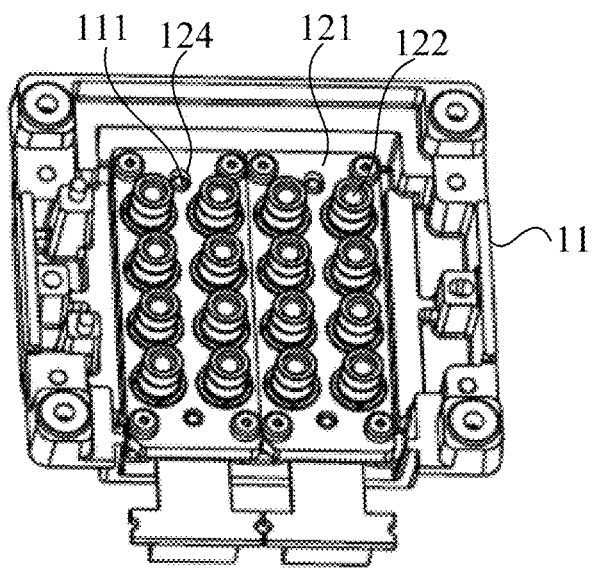
FIG. 13 is an assembly view of a laser and an encapsulating support in a laser module according to some embodiments of the present disclosure.

In order to define the mounting position of the supporting plate 121 on the encapsulating support 11 and ensure the precision of the assembly of the laser 12 and the encapsulating support 11, in some embodiments, as shown in FIG. 5, the encapsulating support 11 includes at least one first positioning post 111 on a surface thereof adjacent to the supporting plate 121. As shown in FIG. 7, the supporting plate 121 has at least one first positioning hole 124. The number of the at least one first positioning post 111 is determined according to the number of the supporting plate(s) 121 and the number of the first positioning hole(s) 124 that the supporting plate(s) 121 have. As shown in FIGS. 12 and 13, when the supporting plate 121 moves toward the encapsulating support 11 and is connected to the encapsulating support 11, the first positioning hole 124 is sleeved outside the first positioning post 111, so as to accurately define the mounting position of the supporting plate 121 and ensure the precision of the assembly of the laser 12 and the encapsulating support 11.

In some embodiments, the at least one first positioning post 111 includes a first positioning post 111, and the at least one first positioning hole 124 includes a first positioning hole 124. In some other embodiments, the at least one first positioning post 111 includes a plurality of first positioning posts, and the at least one first positioning hole 124 includes a plurality of first positioning holes having the same number as the plurality of first positioning posts. For example, as shown in FIGS. 5 and 7, the at least one first positioning post 111 includes two first positioning posts 111, and the at least one first positioning hole 124 includes two first positioning holes 124. The two first positioning posts 111 are assembled with the two first positioning holes 124 respectively, so as to prevent the rotational displacement of the laser 12 relative to the encapsulating support 11. In the meantime, due to the small number of the first positioning posts 111 and the first positioning holes 124, the structural complexity of the laser module is relatively low.

When the number of the first positioning posts 111 and the number of the first positioning holes 124 are both two, the mounting positions of the two first positioning posts 111 and the two first positioning holes 124 are not specifically limited. In some embodiments, as shown in FIG. 7, two first positioning holes 124 are disposed on opposite edges of the supporting plate 121. As shown in FIG. 5, the two first positioning posts 111 are both disposed on a surface of the encapsulating support 11 adjacent to the supporting plate 121, and are respectively corresponding to the two first positioning holes 124. In this way, the positioning will be limited to be more stable.

In some embodiments, in order to accurately define the precision of the assembly of the supporting plate 121 and the encapsulating support 11, the first positioning post 111 is in interference fit with the first positioning hole 124, and a diameter of the first positioning post 111 is larger than a diameter of the first positioning hole 124 by 0.1 mm-0.2 mm, for example, 0.1 mm, 0.15 mm, or 0.2 mm. At this time, the first positioning hole 124 cannot move relative to the first positioning post 111 on a plane perpendicular to the extending direction of the first positioning post 111, so that the precision of the assembly of the supporting plate 121 and the encapsulating support 11 may be accurately defined.

Figure 11:
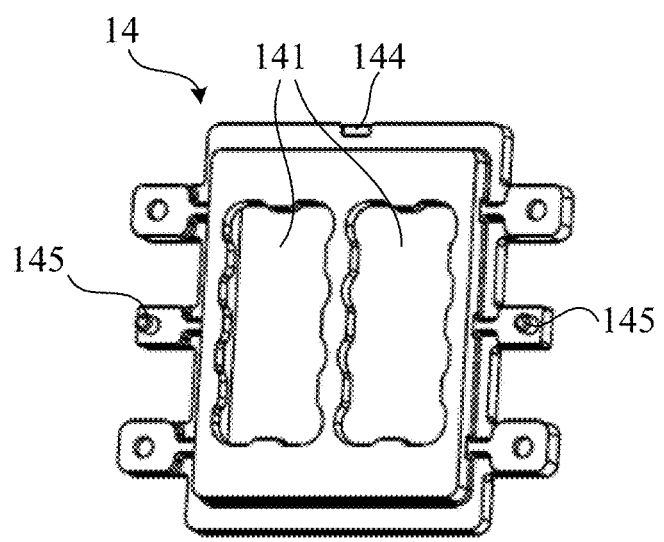
FIG. 11 is a rear view of a pressing plate in a laser module according to some embodiments of the present disclosure.

In order to limit the mounting position of the pressing plate 14 on the encapsulating support 11 and ensure the precision of the assembly of the pressing plate 14 and the encapsulating support 11, in some embodiments, as shown in FIG. 5, the encapsulating support 11 has at least one second positioning hole 112. As shown in FIG. 11, the pressing plate 14 includes at least one second positioning post 145 disposed on a side thereof adjacent to the encapsulating support 11, and the number of the at least one second positioning post 145 is less than or equal to the number of the at least one second positioning hole 112. As shown in FIGS. 18 and 19, when the pressing plate 14 presses the sealing gasket 13 and is connected to the encapsulating support 11, the second positioning post 145 is inserted into the second positioning hole 112, so as to accurately define the mounting position of the pressing plate 14 on the encapsulating support 11 and ensure the precision of the assembly of the pressing plate 14 and the encapsulating support 11.

In some embodiments, the at least one second positioning hole 112 includes a second positioning hole, and the at least one second positioning post 145 includes a second positioning post 145. In some embodiments, the at least one second positioning hole 112 includes a plurality of second positioning holes, and the at least one second positioning post 145 includes a plurality of second positioning posts having the same number as the plurality of second positioning holes. For example, as shown in FIGS. 5 and 11, the at least one second positioning hole 112 includes two second positioning holes 112, and the at least one second positioning post 145 includes two second positioning posts 145. The two positioning holes 112 are assembled with the two second positioning posts 145 respectively, so as to prevent the rotational displacement of the pressing plate 14 relative to the encapsulating support 11. In the meantime, due to the small number of the second positioning holes 112 and the second positioning posts 145, the structural complexity of the laser module is relatively low.

When the number of the second positioning holes 112 and the number of the second positioning posts 145 are both two, the mounting positions of the two second positioning holes 112 and the two second positioning posts 145 are not specifically limited. In some embodiments, as shown in FIG. 5, the two second positioning holes 112 are respectively disposed on opposite edges of the encapsulating support 11. As shown in FIG. 11, the two second positioning posts 145 are both disposed on a surface of the pressing plate 14 adjacent to the encapsulating support 11, and are respectively corresponding to the two second positioning holes 112. In this way, the positioning will be limited to be more stable.

In order to prevent the pressing plate 14 from being mounted in reverse on the supporting plate 121, in some embodiments, as shown in FIG. 11, the pressing plate 14 has a reverse-proof structure 144, which can prevent the pressing plate 14 from being mounted in reverse. The reverse-proof structure 144 is, for example, a groove formed in the pressing plate 14, or a protrusion provided on the pressing plate 14, etc., which is not specifically limited herein.

Figure 6:
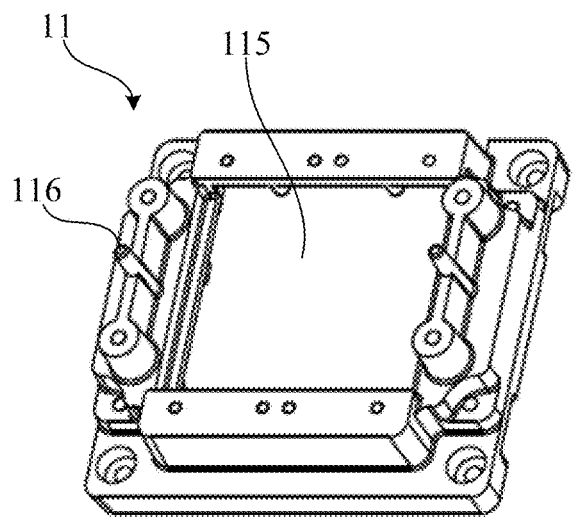
FIG. 6 is a schematic structural view of a second surface of an encapsulating support in a laser module according to some embodiments of the present disclosure.

In some embodiments, the encapsulating support 11 has a structure as shown in FIGS. 5 and 6. That is, the encapsulating support 11 includes a first surface and a second surface that are oppositely disposed, and a first groove 113 extending from the first surface toward the second surface. As shown in FIGS. 12 and 13, the laser 12 is located in the first groove 113, and a surface of the supporting plate 121 away from the laser body 122 is connected to a bottom surface of the first groove 113. In this way, the encapsulating support 11 has a shell structure, and the encapsulating support 11 encapsulates the laser 12 therein, so that the laser 12 is protected to a certain degree and external hard objects are prevented from scratching the laser 12. In some embodiments, the first groove 113 refers to a space formed on the encapsulating support 11 where a side of the encapsulating support 11 close to the sealing gasket 13 recesses inwardly.

Figure 14:
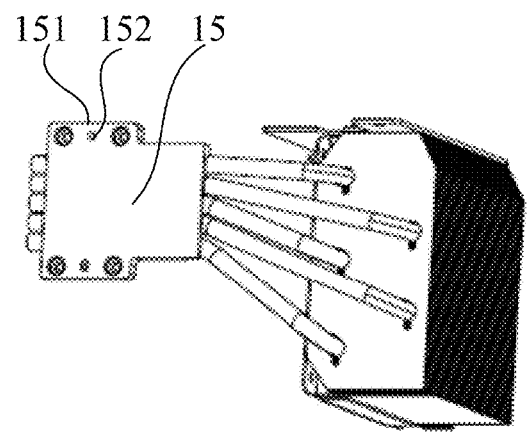
FIG. 14 is a rear view of a heat dissipation plate in a laser module according to some embodiments of the present disclosure.
Figure 15:
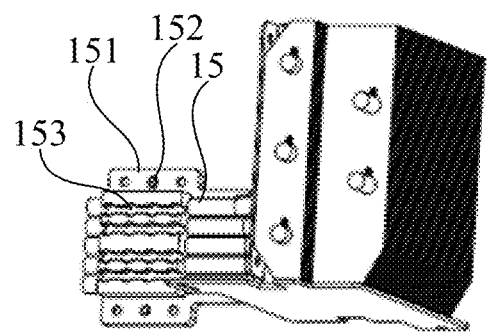
FIG. 15 is a front view of a heat dissipation plate in a laser module according to some embodiments of the present disclosure.

In order to improve the heat dissipation efficiency of the laser 12 and reduce the possibility of water, dust, and other impurities in the external environment entering the first groove 113, in some embodiments, as shown in FIGS. 6, 12, and 13, the supporting plate 121 is connected to edges of the bottom surface of the first groove. As shown in FIGS. 5 and 6, in some embodiments, the first groove 113 has a heat dissipation hole 115 at a center of the bottom surface thereof. The heat dissipation hole 115 extends from the bottom surface of the first groove 113 through the second surface of the encapsulating support 11. In some embodiments, the heat dissipation hole 115 is a through hole disposed in a bottom of the first groove 113. In some embodiments, as shown in FIGS. 6, 14, 15 and 21, the laser module 1 further includes a heat dissipation plate 15 disposed at the heat dissipation hole 115. The heat dissipation plate 15 has a structure as shown in FIGS. 14 and 15. The heat dissipation plate 15 is in thermal contact with the supporting plate 121. In this way, the heat of the laser 12 may be taken away by the heat dissipation plate 15, and the heat dissipation efficiency of the laser 12 may be improved. In the meantime, the heat dissipation plate 15 blocks the heat dissipation hole, which reduces the possibility of water, dust and other impurities in the external environment entering the first groove 113 through the heat dissipation hole.

The shape and size of the heat dissipation hole 115 are not specifically limited.

In some embodiments, as shown in FIGS. 14 and 15, the heat dissipation plate 15 is fixed to a second surface of the encapsulating support 11 away from the sealing gasket 13, and the heat dissipation plate 15 and the encapsulating support 11 are directly attached to each other at a position where they are connected. In some other embodiments, a thermally conductive paste or a thermal pad is disposed between the heat dissipation plate 15 and the encapsulating support 11 at the position where the heat dissipation plate 15 and the encapsulating support 11 are connected, so as to enhance the sealing effect while achieving heat conduction. In some embodiments, in order to fix the heat dissipation plate 15 at the heat dissipation hole 115, as shown in FIGS. 14 and 15, the heat dissipation plate 15 has connecting lugs 151 disposed on opposite edges thereof, for example, disposed on edges of a surface of the heat dissipation plate 15 away from the supporting plate 121, and the connecting lugs 151 are connected with the second surface of the encapsulating support 11. In this way, the heat dissipation plate 15 is connected to the encapsulating support 11 through the connecting lugs 151. This structure is simple and easy to implement.

In order to define the mounting position of the heat dissipation plate 15 on the encapsulating support 11 and ensure the precision of the assembly of the heat dissipation plate 15 and the encapsulating support 11, in some embodiments, as shown in FIG. 6, the encapsulating support 11 further includes third positioning posts 116 disposed on the second surface thereof. As shown in FIGS. 14 and 15, the connecting lugs 151 have third positioning holes 152. When the heat dissipation plate 15 moves toward the encapsulating support 11 and is connected to the second surface of the encapsulating support 11, the third positioning holes 152 are sleeved outside the third positioning posts 116 respectively, so as to accurately define the mounting position of the heat dissipation plate 15 on the encapsulating support and ensure the precision of the assembly of the heat dissipation plate 15 and the encapsulating support 11.

Figure 8:
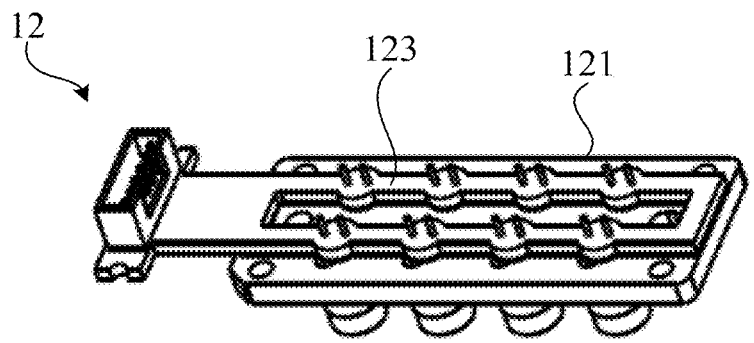
FIG. 8 is a rear schematic view of a laser in a laser module according to some embodiments of the present disclosure.
Figure 9:
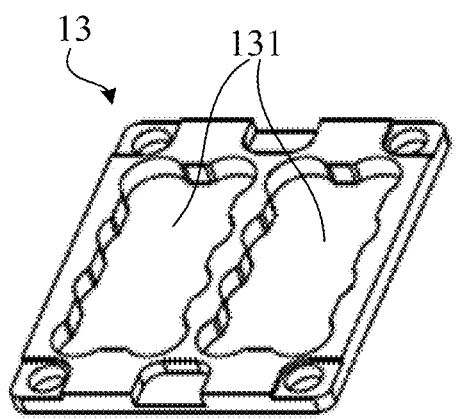
FIG. 9 is a schematic structural view of a sealing gasket in a laser module according to some embodiments of the present disclosure.

In some embodiments, as shown in FIG. 8, the laser 12 further includes a circuit board 123, and the circuit board 123 is configured to introduce power and control signals to the laser body 122. The circuit board 123 is a component with high heat generation in the laser 12, so in order to improve the heat dissipation efficiency of the circuit board 123, in some embodiments, as shown in FIG. 4, the circuit board 123 is fixed on a surface of the supporting plate 121 close to the heat dissipation plate 15. As shown in FIG. 15, the heat dissipation plate 15 has a second groove 153 at a position corresponding to the circuit board 123. The circuit board 123 is received in the second groove 153, and the circuit board 123 is in thermal contact with an inner wall of the second groove 153. In this way, the heat of the circuit board 123 may be taken away by the heat dissipation plate 15, and thus the heat dissipation efficiency of the circuit board 123 may be improved. In some embodiments, the circuit board 123 is in direct contact with the inner wall of the second groove 153.

Figure 16:
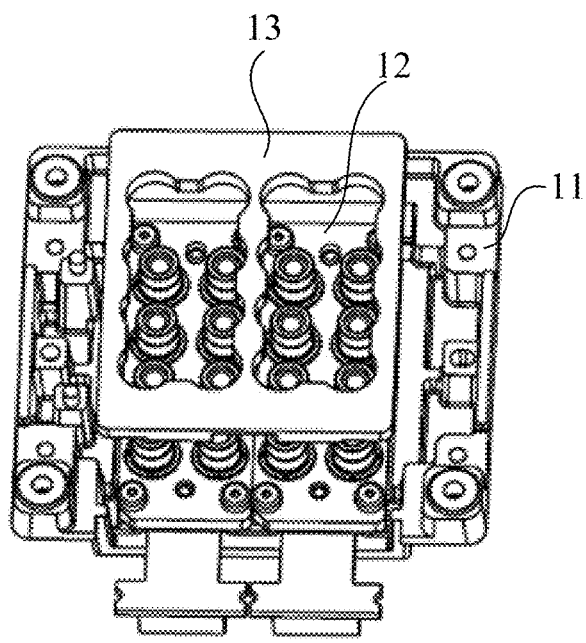
FIG. 16 is a schematic structural view of a sealing gasket mounted on a laser and an encapsulating support in a laser module according to some embodiments of the present disclosure.
Figure 17:
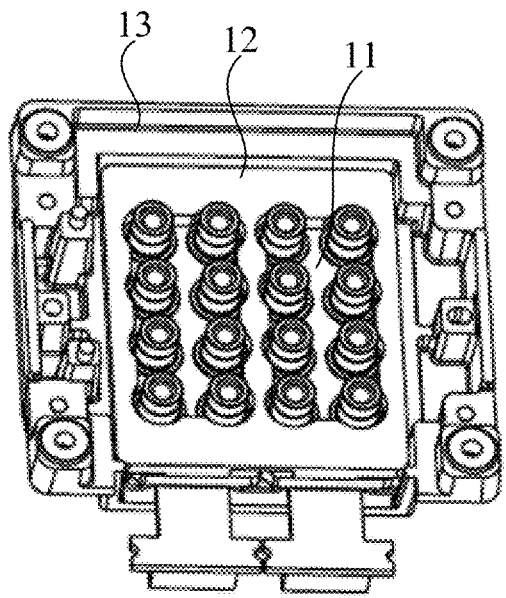
FIG. 17 is an assembly view of a sealing gasket, a laser and an encapsulating support in a laser module according to some embodiments of the present disclosure.

In some embodiments, in order to increase the light emitting area of the laser module 1, as shown in FIGS. 12 and 13, the laser module 1 includes a plurality of lasers 12, and the plurality of lasers 12 are fixed side by side on the encapsulating support 11. There is a gap between any two adjacent supporting plates 121 in the supporting plates 121 on which the plurality of lasers 12 are located. In order to prevent water, dust and other impurities in the external environment from entering the optical path of the laser 12 through the gap, in some embodiments, as shown in FIGS. 16 and 17, the sealing gasket 13 is located on the supporting plates 121 of the plurality of lasers 12, and the sealing gasket 13 covers the gap between any two adjacent supporting plates 121. In this way, the gap between any two adjacent supporting plates 121 may be sealed by the sealing gasket 13, and water, dust, and other impurities in the external environment may be prevented from entering the optical path of the laser 12 through the gap.

In some embodiments, the plurality of lasers 12 are configured to simultaneously emit a laser beam. In some other embodiments, a portion of the plurality of lasers 12 are configured to simultaneously emit a laser beam, which is not specifically limited herein. In some embodiments, when a portion of the plurality of lasers 12 are configured to simultaneously emit the laser beam, at least one laser 12 not used in the laser module are removed, and a subplate with the exact same size as at least one supporting plate in the at least one laser is used to fill the space occupied by the at least one laser 12 that is removed, so as to effectively seal and encapsulate the lasers 12 that emit the laser beam. For the structure and material of the subplate, reference can be made to, for example, the sealing gasket 13.

Figure 20:
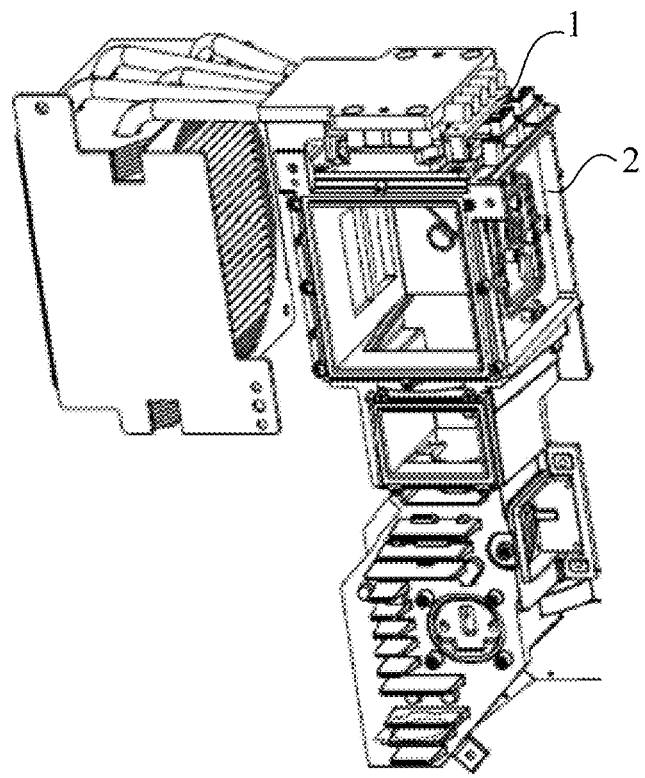
FIG. 20 is a schematic structural view of a laser projection device according to some embodiments of the present disclosure.
Figure 21:
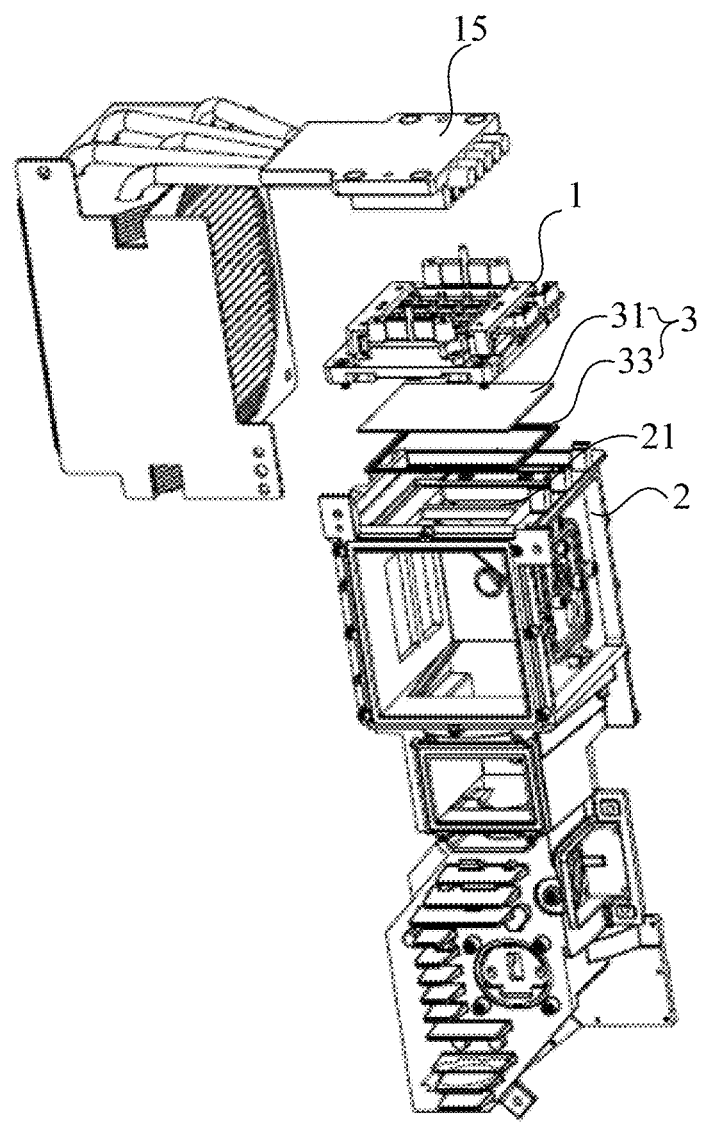
FIG. 21 is an exploded view of the laser projection device shown in FIG. 20.

FIGS. 20 and 21 show a laser projection device according to some embodiments of the present disclosure. Referring to FIGS. 20 and 21, the laser projection device includes a laser module 1 and a main housing 2. The laser module 1 is the laser module as described in any of the above embodiments. The main housing 2 is configured to seal the components provided on the optical path. The main housing 2 is located on a light exit side of the laser module 1, and the encapsulating support of the laser module 1 is connected with the main housing 2. The main housing 2 has a third opening 21, and the third opening 21 is opposite to the second opening of the laser module 1. The pressing plate of the laser module 1 and an edge of the main housing 2 at the third opening 21 are connected and sealed by a sealing structure 3.

In the laser projection device, as the pressing plate 14 of the laser module 1 and the edge of the main housing 2 at the third opening 21 are connected and sealed by the sealing structure 3, the optical path between the laser module 1 and the main housing 2 is sealed by the sealing structure 3. As a result, impurities in the external environment are prevented from entering through the connection between the laser module 1 and the main housing 2 and thus affecting the internal optical path and intensity of the laser projection device.

Figure 22:
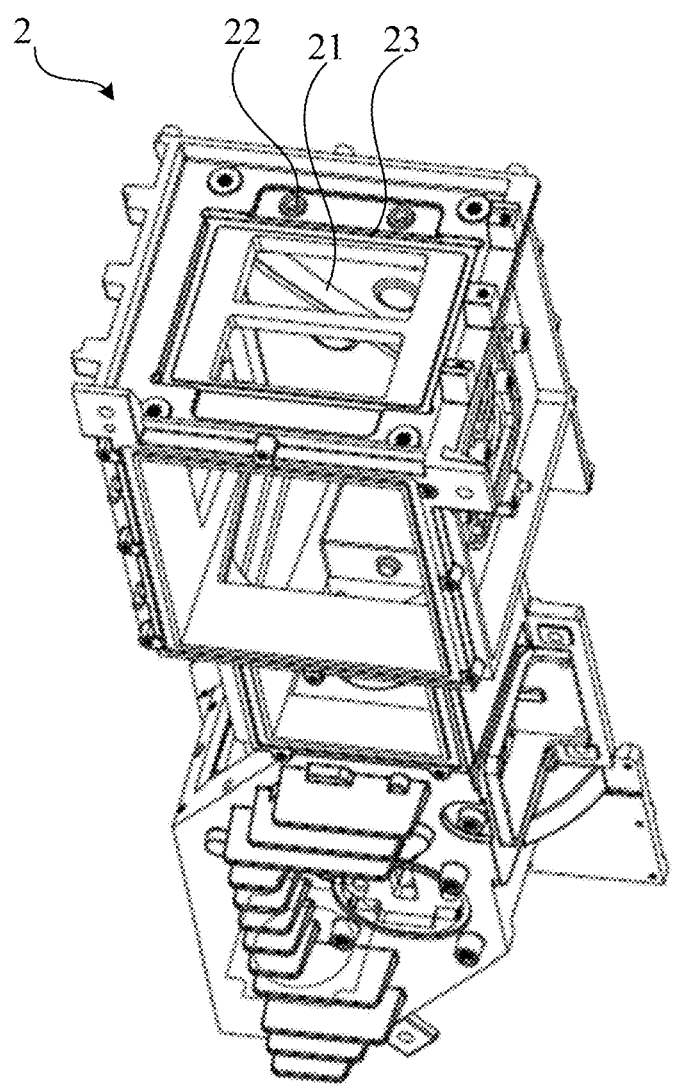
FIG. 22 is a schematic structural view of a main housing in a laser projection device according to some embodiments of the present disclosure.

In order to define the mounting position of the laser module 1 on the main housing 2 and ensure the precision of the assembly of the laser module 1 and the main housing 2, in some embodiments, as shown in FIG. 5, the encapsulating support 11 of the laser module includes fourth positioning posts 114 disposed on a surface thereof adjacent to the main housing. As shown in FIG. 22, the main housing 2 has fourth positioning holes 22. As shown in FIGS. 20 and 21, when the laser module 1 moves toward the main housing 2 and is connected to the main housing 2, the fourth positioning posts 114 are inserted into the fourth positioning holes 22 respectively, so as to accurately define the mounting position of the laser module 1 on the main housing 2 and ensure the precision of the assembly of the laser module 1 and the main housing 2.

In addition, the structure of the sealing structure 3 is not limited. In some embodiments, as shown in FIGS. 21 and 4, the sealing structure 3 includes an optically transparent plate 31, a first sealing ring 32, and a second sealing ring 33. The optically transparent plate 31 is located between the pressing plate 14 of the laser module 1 and the main housing 2. The first sealing ring 32 is located between the pressing plate 14 and the optically transparent plate 31, and the first sealing ring 32 surrounds a circumference of the second opening 141 of the laser module 1. The second sealing ring 33 is located between the main housing 2 and the optically transparent plate 31, and the second sealing ring 33 surrounds a circumference of the third opening 21 of the main housing 2. The flatness of the optically transparent plate 31 is relatively high, so that forces on the first sealing ring 32 and the second sealing ring 33 are relatively even. Therefore, misalignment of the first sealing ring 32 and the second sealing ring 33 is effectively prevented and the possibility of external impurities entering the optical path through the gap between the pressing plate 14 and the main housing 2 is reduced.

In some embodiments, the first sealing ring 32 and the second sealing ring 33 are made of a silicone material. In some other embodiments, the first sealing ring 32 and the second sealing ring 33 are made of a fluororubber material. With this arrangement, since fluororubber is resistant to high temperatures and is stable in shape at a high temperature and does not generate gas, it is possible to avoid influence on the internal optical path of the laser projection device.

A thickness of the optically transparent plate 31 is, for example, 1 mm, 2 mm, or 3 mm, which is not limited herein.

The material of the optically transparent plate 31 is, for example, glass or acrylic, which is not limited herein. However, since glass is a commonly used material and is inexpensive, it is easy to realize the structure using glass and the cost is low.

Figure 10:
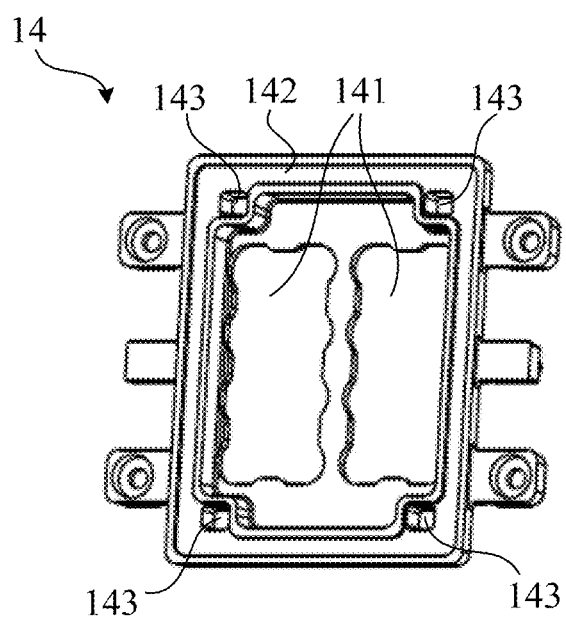
FIG. 10 is a front view of a pressing plate in a laser module according to some embodiments of the present disclosure.

In order to prevent misalignment of the first sealing ring 32, in some embodiments, as shown in FIG. 10, the pressing plate 14 includes an annular groove 142. The annular groove 142 opens toward the first sealing ring 32 and surrounds a circumference of the second opening 141 of the laser module 1. One end of the first sealing ring 32 close to the pressing plate 14 is fitted into the annular groove 142. In this way, the relative position between the first sealing ring 32 and the pressing plate 14 may be restricted by the annular groove 142, and misalignment of the first sealing ring 32 may be prevented. In some embodiments, the annular groove 142 includes a bottom wall, an inner wall and an outer wall, and a cross-section of the annular groove 142 on a plane perpendicular to the extending direction of the bottom wall is U-shaped.

Figure 23:
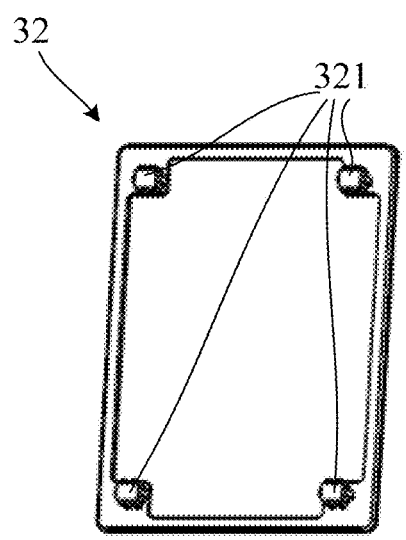
FIG. 23 is a schematic structural view of a first sealing ring in a laser projection device according to some embodiments of the present disclosure.

In order to prevent misalignment of the first sealing ring 32, in some embodiments, as shown in FIGS. 10 and 23, the pressing plate 14 includes first positioning slots 143, and the first sealing ring 32 includes first positioning fasteners 321 disposed on a surface thereof adjacent to the pressing plate 14. The first positioning fasteners 321 are locked in the first positioning slots 143 respectively. In some other embodiments, the pressing plate 14 includes second positioning fasteners disposed on a surface thereof adjacent to the first sealing ring 32. The first sealing ring 32 includes second positioning slots, and the second positioning fasteners are locked in the second positioning slots respectively. In this way, the relative position between the first sealing ring 32 and the pressing plate 14 is defined by the positioning fasteners and the positioning slots, and misalignment of the first sealing ring 32 is prevented. For the structure of the second positioning fastener, reference can be made to the structure of the first positioning fastener 321. For the structure of the second positioning slot, reference can be made to the structure of the first positioning slot 143.

In order to prevent misalignment of the second sealing ring 33, in some embodiments, as shown in FIG. 22, the main housing 2 includes an annular slot 23. The annual slot 23 is formed on an outer wall of the main housing adjacent to the pressing plate, and surrounds a circumference of the third opening 21 of the main housing 2. As shown in FIG. 21, one end of the second sealing ring 33 adjacent to the main housing 2 is fitted into the annular slot 23. In this way, the relative position between the second sealing ring 33 and the main housing 2 may be restricted by the annular slot 23, and misalignment of the second sealing ring 33 may be prevented.

Figure 24:
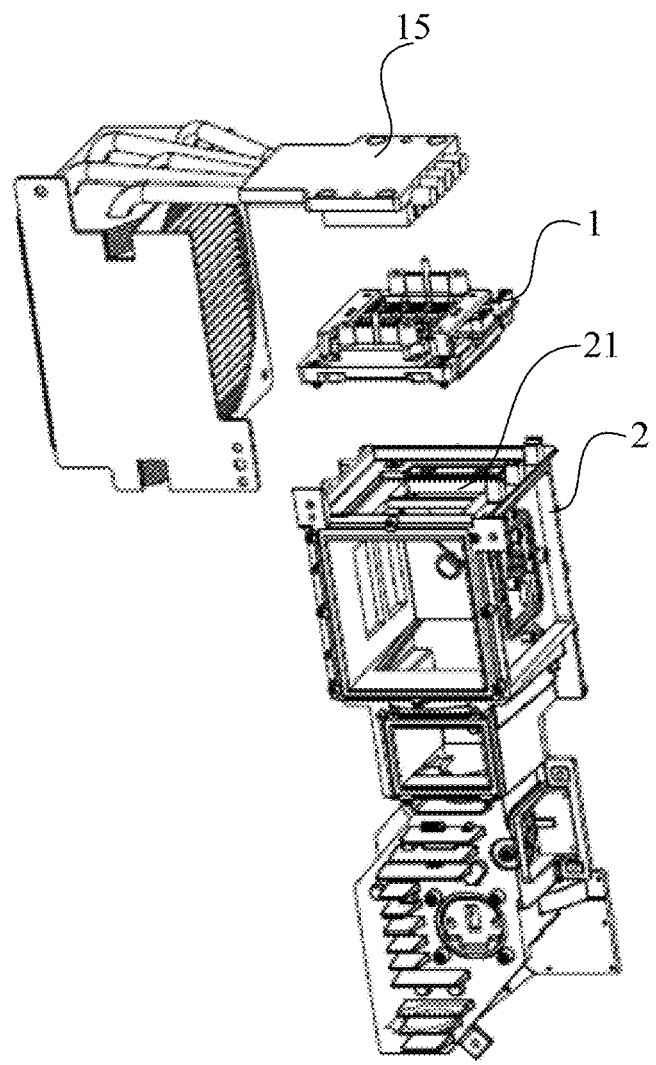
FIG. 24 is an exploded view of a structure of another laser projection device according to some embodiments of the present disclosure.
Figure 25:
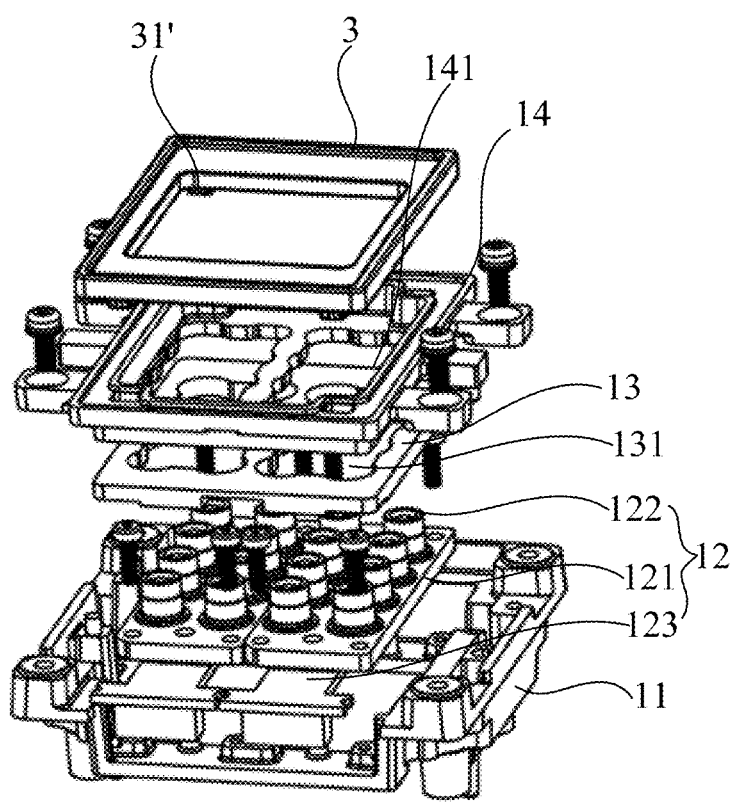
FIG. 25 is a schematic structural view of a laser module and a sealing ring in the laser projection device shown in FIG. 24.

In some embodiments, as shown in FIGS. 24 and 25, the sealing structure 3 is a sealing ring. The sealing ring is disposed between the pressing plate 14 and the main housing 2, and the sealing ring surrounds a circumference of the second opening 141 of the laser module 1 and a circumference of the third opening 21 of the main housing 2. This structure is simple and easy to implement.

In some embodiments, the sealing ring is made of a silicone material. In some other embodiments, the sealing ring is made of a fluororubber material. With this arrangement, since fluororubber is resistant to high temperatures and is stable in shape at a high temperature and does not generate gas, it is possible to avoid influence on the internal optical path of the laser projection device.

In order to prevent misalignment of the sealing ring, in some embodiments, as shown in FIG. 10, the pressing plate 14 includes an annular groove 142, and the annular groove 142 surrounds a circumference of the second opening 141 of the laser module 1. One end of the sealing ring close to the pressing plate 14 is fitted into the annular groove 142. In this way, the relative position between the sealing ring and the pressing plate 14 may be restricted by the annular groove 142 and misalignment of the sealing ring may be prevented. In some embodiments, the sealing ring includes a protrusion disposed on one end thereof close to the pressing plate 14, and the protrusion is disposed along a circumference of the sealing ring. The protrusion is fitted into the annular groove 142.

In order to further prevent the misalignment of the sealing ring, in some embodiments, the pressing plate 14 includes third positioning fasteners disposed on a surface thereof adjacent to the sealing ring. The sealing ring includes third positioning slots, and the third positioning fasteners are locked in the third positioning slots respectively. In some other embodiments, as shown in FIG. 10, the pressing plate 14 includes fourth positioning slots 143. The sealing ring includes fourth positioning fasteners 31' disposed on a surface thereof adjacent to the pressing plate 14, and the fourth positioning fasteners 31' are locked in the fourth positioning slots 143 respectively. In this way, the relative position between the sealing ring and the pressing plate 14 is defined by the positioning fasteners and the positioning slots, and misalignment of the sealing ring is prevented. For the structure of the third positioning fastener, reference can be made to the structure of the fourth positioning fastener 31'. For the structure of the third positioning slot, reference can be made to the structure of the fourth positioning slot 143.

The other configurations of the laser projection device relating to the embodiments of the present disclosure are well known to those skilled in the art and will not be described in detail herein.

The foregoing descriptions are merely some implementation manners of the present disclosure, but the protection scope of the present disclosure is not limited thereto, and the changes or replacements that any person skilled in the art can easily think of should be within the scope of protection of the present disclosure. Therefore, the protection scope of the present disclosure shall be subject to the protection scope of the claims.

What is claimed is:

1. A laser projection device, comprising:
   a laser assembly, and
   a main housing located on a light exit side of the laser assembly;
   wherein the laser assembly comprises:
   an encapsulating support configured to encapsulate at least one laser array;
   the at least one laser array, wherein each laser array includes a supporting plate and a plurality of laser bodies fixed to the supporting plate, wherein the supporting plate is fixed to the encapsulating support, and wherein an end of the plurality of laser bodies includes a light exit end face on a surface facing away from the supporting plate;
   a sealing gasket located on a surface of the supporting plate proximate to the light exit end face, wherein the sealing gasket has a first opening at a position corresponding to the plurality of laser bodies and the sealing gasket has elasticity; and
   a pressing plate located on and directly contacting a surface of the sealing gasket facing away from the supporting plate, wherein the pressing plate is fixed to the encapsulating support via at least one fastener extending from the pressing plate to encapsulating support, and wherein the pressing plate has a second opening at a position corresponding to the first opening, and wherein elasticity of the pressing plate is less than the elasticity of the sealing gasket to press the sealing gasket against the supporting plate when the fastener extending from the pressing plate to the encapsulating support is secured, and wherein the pressing plate comprises an annular groove and the annular groove surrounds the circumference of the second opening of the laser assembly,
   wherein the encapsulating support of the laser assembly is connected to the main housing, wherein the main housing has a third opening, wherein the third opening is opposite to the second opening of the laser assembly, and wherein the pressing plate and an edge of the main housing at the third opening are connected and sealed by a sealing structure.

2. The laser projection device according to claim 1, further comprising a heat dissipating plate disposed proximate to a heat dissipating hole, wherein the heat dissipating plate is in contact with the supporting plate and configured to dissipate heat from the supporting plate.

3. The laser projection device according to claim 2, wherein each laser array further comprises a circuit board, wherein the supporting plate comprises a second groove that extends from a surface thereof close to the heat dissipating plate toward a surface thereof facing away from the heat dissipating plate, wherein the circuit board is received in the second groove in a fixed manner, and wherein an inner wall of the second groove is in contact with the circuit board and configured to dissipate heat from the circuit board.

4. The laser projection device according to claim 1, wherein the at least one laser array comprises a plurality of laser arrays, wherein the plurality of laser arrays are fixed side by side on the encapsulating support, wherein the sealing gasket is located on a plurality of supporting plates of the plurality of laser arrays, and wherein the sealing gasket covers a gap between two adjacent supporting plates.

5. The laser projection device according to claim 1, wherein a sum of a thickness of the sealing gasket and a thickness of the pressing plate is greater than or equal to a height of the plurality of laser bodies protruding from the supporting plate.

6. The laser projection device according to claim 1, wherein the sealing structure comprises:
   an optically transparent plate located between the pressing plate and the main housing;
   a first sealing ring disposed between the pressing plate and the optically transparent plate, wherein the first sealing ring surrounds a circumference of the second opening of the laser assembly; and
   a second sealing ring disposed between the main housing and the optically transparent plate, wherein the second sealing ring surrounds a circumference of the third opening of the main housing.

7. The laser projection device according to claim 6, wherein one end of the first sealing ring close to the pressing plate is fitted into the annular groove of the pressing plate.

8. The laser projection device according to claim 6, wherein the pressing plate comprises first positioning slots, wherein the first sealing ring comprises first positioning fasteners disposed on a surface thereof adjacent to the pressing plate, and wherein the first positioning fasteners are locked in the first positioning slots respectively; or
wherein the pressing plate comprises second positioning fasteners disposed on a surface thereof adjacent to the first sealing ring, wherein the first sealing ring comprises second positioning slots, and wherein the second positioning fasteners are locked in the second positioning slots.

9. The laser projection device according to claim 6, wherein the main housing comprises an annular slot formed on an outer wall of the main housing adjacent to the pressing plate, wherein the annular slot surrounds a circumference of the third opening of the main housing, and wherein an end of the second sealing ring adjacent to the main housing is fitted into the annular slot.

10. The laser projection device according to claim 1, wherein the sealing structure is a sealing ring, wherein the sealing ring is positioned between the pressing plate and the main housing, and wherein the sealing ring surrounds a circumference of the second opening of a laser assembly and a circumference of the third opening of the main housing, and one end of the sealing ring close to the pressing plate is fitted into the annular groove of the pressing plate.

11. The laser projection device according to claim 1, wherein the encapsulating support comprises:
a first surface and a second surface that are oppositely disposed; and
a groove extending from the first surface toward the second surface, wherein the at least one laser array is located in a first groove, and wherein a surface of the supporting plate facing away from the sealing gasket is connected to a bottom surface of the first groove.

12. The laser projection device according to claim 11, wherein the supporting plate is connected to edges of the bottom surface of the first groove, wherein the first groove has a heat dissipating hole at a center of the bottom surface, and wherein the heat dissipating hole penetrates the bottom surface and the second surface of the encapsulating support.

13. A method, comprising:
securing a laser array to an encapsulating support, wherein the laser array includes a plurality of laser bodies that is fixed to a supporting plate, and wherein an end of the plurality of laser bodies includes light exit end face on a surface facing away from the supporting plate;
placing a sealing gasket at a location on a surface of the supporting plate proximate to the light exit end face, wherein the sealing gasket has a first opening at a position corresponding to the plurality of laser bodies; and
placing a pressing plate at a located on a surface of the sealing gasket facing away from the supporting plate, wherein the pressing plate is in direct contact with the surface of the sealing gasket facing away from the supporting plate, and is fixed to the encapsulating support via at least one fastener extending from the pressing plate to encapsulating support; wherein elasticity of the pressing plate is less than the elasticity of the sealing gasket to press the sealing gasket against the supporting plate when the fastener extending from the pressing plate to the encapsulating support is secured;
wherein the pressing plate has a second opening at a position corresponding to the first opening, and wherein the pressing plate comprises an annular groove, the annular groove surrounds the circumference of the second opening of the pressing plate.

14. The method of claim 13, wherein a sum of a thickness of the sealing gasket and a thickness of the pressing plate is greater than or equal to a height of the plurality of laser bodies protruding from the supporting plate.

* * * * *